(12) United States Patent
Li et al.

(10) Patent No.: US 12,360,382 B2
(45) Date of Patent: Jul. 15, 2025

(54) HEAD-UP DISPLAY APPARATUS AND HEAD-UP DISPLAY METHOD

(71) Applicant: Shenzhen Yinwang Intelligent Technologies Co., Ltd., Shenzhen (CN)

(72) Inventors: Xiao Li, Dongguan (CN); Qingcong Lu, Dongguan (CN); Tianhai Chang, Dongguan (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/055,143

(22) Filed: Nov. 14, 2022

(65) Prior Publication Data

US 2023/0063712 A1 Mar. 2, 2023

Related U.S. Application Data

(63) Continuation of application No. PCT/CN2021/088159, filed on Apr. 19, 2021.

(30) Foreign Application Priority Data

May 15, 2020 (CN) .......................... 202010412233.8

(51) Int. Cl.
*G02B 27/01* (2006.01)
*B60R 1/24* (2022.01)

(52) U.S. Cl.
CPC ............ *G02B 27/0179* (2013.01); *B60R 1/24* (2022.01); *G02B 27/0189* (2013.01); *G02B 2027/0187* (2013.01)

(58) Field of Classification Search
CPC . G06F 3/013; G02B 27/0189; G02B 27/0101; G02B 27/283; G02B 27/0179;
(Continued)

(56) References Cited

U.S. PATENT DOCUMENTS 7,961,117 B1 6/2011 Zimmerman et al.
9,164,281 B2 * 10/2015 Hing ..................... G02B 27/01
(Continued)

FOREIGN PATENT DOCUMENTS

CN 105787884 A 7/2016
CN 106226910 A 12/2016
(Continued)

OTHER PUBLICATIONS

English Translation for CN-109649275-A, 2023, pp. 1-7 (Year: 2023).*

*Primary Examiner* — Jimmy H Nguyen
(74) *Attorney, Agent, or Firm* — Leydig, Voit & Mayer, Ltd.

(57) ABSTRACT

This application provides a head-up display apparatus and a display method. The display method comprising: obtaining line-of-sight information of a user, and determining a target display area of a head-up display based on the line-of-sight information, wherein the target display area is a sub-area of an overall display area of the head-up display; adjusting a light field to generate a real image of target content based on the target content in the target display area; and forming a light beam based on the real image of the target content, and projecting the light beam onto a windshield, to generate a virtual image of the target content.

20 Claims, 6 Drawing Sheets

(58) Field of Classification Search
CPC .... G02B 2027/0187; G02B 2027/0093; B60R 1/24
USPC ......................................................... 345/7, 8
See application file for complete search history.

(56) References Cited

U.S. PATENT DOCUMENTS

| | | |
|---|---|---|
| 9,400,385 B2 | 7/2016 | Hing et al. |
| 2002/0191235 A1* | 12/2002 | O'Connor ............ G02B 27/283 |
| | | 359/9 |
| 2013/0096820 A1* | 4/2013 | Agnew .................... B60R 1/00 |
| | | 701/428 |
| 2016/0266390 A1 | 9/2016 | Seo et al. |
| 2019/0018238 A1 | 1/2019 | Jenson et al. |
| 2021/0070176 A1* | 3/2021 | Rao ......................... G02B 30/29 |
| 2021/0252978 A1* | 8/2021 | Christmas .......... G02B 27/0172 |

FOREIGN PATENT DOCUMENTS

| | | |
|---|---|---|
| CN | 106444021 A | 2/2017 |
| CN | 106662739 A | 5/2017 |
| CN | 108700751 A | 10/2018 |
| CN | 109050401 A | 12/2018 |
| CN | 109212753 A | 1/2019 |
| CN | 109649275 A | 4/2019 |
| CN | 109668575 A | 4/2019 |
| CN | 110471532 A | 11/2019 |
| CN | 110738952 A | 1/2020 |
| WO | 2019212633 A1 | 11/2019 |
| WO | WO-2019212634 A1 * | 11/2019 ............. B60K 35/00 |

* cited by examiner

HEAD-UP DISPLAY APPARATUS AND HEAD-UP DISPLAY METHOD

CROSS-REFERENCE TO RELATED APPLICATIONS

This application is a continuation of International Application No. PCT/CN2021/088159, filed on Apr. 19, 2021, which claims priority to Chinese Patent Application No. 202010412233.8, filed on May 15, 2020. The disclosures of the aforementioned applications are hereby incorporated by reference in their entireties.

TECHNICAL FIELD

This application relates to the image processing field, and more specifically, to a head-up display apparatus and a head-up display method.

BACKGROUND

A head-up display (HUD) technology is also referred to as a heads-up display technology, and has been more widely applied to the automotive field, the aerospace field, and the navigation field in recent years. For example, in the automotive field, the HUD technology projects important information obtained during traveling of a vehicle onto a windshield, so that a driver of a vehicle in which an HUD apparatus is installed can view the information without lowering the head. This can help a novice driver lacking speed judgment control a vehicle speed, to avoid regulation violation due to speeding in many speed-limited road sections. More importantly, the HUD technology can enable the driver to instantly take readings without lowering or turning the head and always keep in an optimal observation state, to avoid the following case: When the driver lowers or turns the head to view information on an instrument or the like, the driver causes an accident because the driver fails to take an effective measure in time due to an emergency ahead.

A current HUD technology covers an entire display area with all information obtained during traveling. Consequently, excessive information may interfere with driving of a user, and power consumption is relatively high in a high brightness case. In addition, a service life of a display element of an HUD apparatus is reduced.

SUMMARY

This application provides a head-up display apparatus and a head-up display method, to reduce power consumption of the head-up display apparatus, prolong a service life of a display element, and enable a user to obtain a good visual effect, thereby helping improve driving safety.

According to a first aspect, a head-up display apparatus is provided, including a visual positioning unit, an image determining unit, an image control unit, an image display unit, and an optical unit. The visual positioning unit is configured to: obtain line-of-sight information of a user, and determine a target display area based on the line-of-sight information, where the target display area is a sub-area of an overall display area corresponding to the image display unit. The image determining unit is configured to determine an image of target content in the target display area, where the target content is content corresponding to the target display area in to-be-displayed content of the overall display area. The image control unit is configured to adjust a light field to generate a real image of the target content in the target display area based on the image of the target content. The image display unit is configured to display the real image of the target content. The optical unit is configured to form a light beam based on the real image of the target content, to generate a virtual image of the target content.

It should be understood that the visual positioning unit may obtain an image of a head, a face, or eyes by using a camera or the like, and parse out the line-of-sight information by using software; and then analyze the line-of-sight information to implement line-of-sight positioning and tracking, to determine the target display area. The visual positioning unit may be an eye tracking system, an Eye Tribe line-of-sight tracker, or the like.

It should be understood that the image display unit may be a carrier that can be used for projection imaging, such as a diffusor or a screen.

It should be understood that the optical unit may include a lens or a lens group.

In the head-up display apparatus provided in the first aspect, the target display area is determined based on the line-of-sight information of the user, where the target display area is the sub-area of the overall display area; and only the target content in the target display area is displayed, and content in an area other than the target display area is not displayed, so that power consumption of the head-up display apparatus can be reduced and a service life of a display element can be prolonged. In addition, displayed content can better conform to a visual characteristic of the user, to prevent excessive redundant information from interfering with the user, to enable the user to obtain a good visual effect, thereby helping improve driving safety.

In a possible implementation of the first aspect, the overall display area includes a plurality of sub-areas, and each of the plurality of sub-areas corresponds to a part of the to-be-displayed content. The target display area is one of the plurality of sub-areas.

In a possible implementation of the first aspect, the plurality of sub-areas are obtained by dividing the overall display area in a fixed division manner or in an adaptive division manner. The fixed division manner is simple and is easy to implement. The adaptive division manner is flexible and is applicable to more scenarios, for example, an AR scenario.

In a possible implementation of the first aspect, the to-be-displayed content may include transport status content, road status content, navigation content, and the like. The target content includes at least one of the transport status content, the road status content, and the navigation content.

In a possible implementation of the first aspect, the image control unit may include a spatial light modulator SLM. The image control unit may further include a light source. In this possible implementation, image control is performed by using the SLM, so that a structure is simple and modulation is fast.

In a possible implementation of the first aspect, the image control unit may include two stages of SLMs. A first-stage SLM is configured to illuminate the target display area, and a second-stage SLM is configured to load the image of the target content. In this possible implementation, because light ray energy is concentrated in the target display area for imaging, imaging brightness is high.

In a possible implementation of the first aspect, the two stages of SLMs may be two stages of LCOS elements. A first-stage LCOS element is configured to illuminate the target display area, and a second-stage LCOS element is configured to load the image of the target content. The LCOS element achieves simple and fast modulation.

A specific implementation of the two stages of LCOS elements may include: the first-stage LCOS element in the two stages of LCOS elements is a phase-type LCOS element, and the second-stage LCOS element in the two stages of LCOS elements is an amplitude-type LCOS element.

A specific implementation of the two stages of LCOS elements may alternatively include: both the first-stage LCOS element and the second-stage LCOS element in the two stages of LCOS elements are phase-type LCOS elements.

A specific implementation of the two stages of LCOS elements may alternatively include: both the first-stage LCOS element and the second-stage LCOS element in the two stages of LCOS elements are phase-type LCOS elements, there is a first polarizer between the first-stage LCOS element and the second-stage LCOS element, and there is a second polarizer behind the second-stage LCOS element.

According to a second aspect, a head-up display method is provided, including: obtaining line-of-sight information of a user, and determining a target display area based on the line-of-sight information, where the target display area is a sub-area of an overall display area; determining an image of target content in the target display area, where the target content is content corresponding to the target display area in to-be-displayed content of the overall display area; adjusting a light field to generate a real image of the target content in the target display area based on the image of the target content; displaying the real image of the target content; and forming a light beam based on the real image of the target content, to generate a virtual image of the target content.

In a possible implementation of the second aspect, the adjusting a light field to generate a real image of the target content in the target display area based on the image of the target content may include: adjusting the light field by using two stages of spatial light modulators SLMs, to generate the real image of the target content in the target display area based on the image of the target content.

In a possible implementation of the second aspect, the two stages of SLMs are two stages of LCOS elements.

In a possible implementation of the second aspect, a first-stage LCOS element in the two stages of LCOS elements is a phase-type LCOS element, and a second-stage LCOS element in the two stages of LCOS elements is an amplitude-type LCOS element.

In a possible implementation of the second aspect, both a first-stage LCOS element and a second-stage LCOS element in the two stages of LCOS elements are phase-type LCOS elements.

In a possible implementation of the second aspect, there is a first polarizer between the first-stage LCOS element and the second-stage LCOS element, and there is a second polarizer behind the second-stage LCOS element.

In a possible implementation of the second aspect, the overall display area corresponding to an image display unit includes a plurality of sub-areas, and each of the plurality of sub-areas corresponds to a part of the to-be-displayed content. The target display area is one of the plurality of sub-areas.

In a possible implementation of the second aspect, the plurality of sub-areas are obtained by dividing the overall display area in a fixed division manner or in an adaptive division manner.

In a possible implementation of the second aspect, the target content includes at least one of transport status content, road status content, and navigation content.

According to a third aspect, a computer-readable medium is provided, configured to store a computer program. The computer program includes instructions used to perform the method according to any one of the second aspect or the possible implementations of the second aspect.

According to a fourth aspect, a computer program is provided. The computer program includes instructions used to perform the method according to any one of the second aspect or the possible implementations of the second aspect.

According to a fifth aspect, a chip is provided. Instructions are stored in the chip, and when the instructions run on a head-up display apparatus, the head-up display apparatus is enabled to perform the method according to any one of the second aspect or the possible implementations of the second aspect.

DETAILED DESCRIPTION OF ILLUSTRATIVE EMBODIMENTS

The following describes technical solutions of this application with reference to accompanying drawings.

Figure 1:
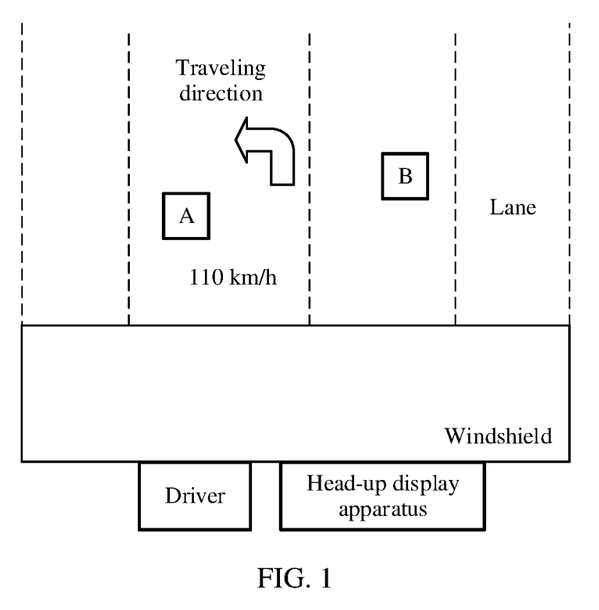
FIG. 1 is a schematic diagram of a head-up display scenario.

FIG. 1 is a schematic diagram of a head-up display scenario. As shown in FIG. 1, a head-up display apparatus may be installed near a windshield. It is assumed that in the head-up display scenario, there are an object A and an object B (for example, a traveling vehicle and a passing pedestrian) in front of a driver or a front passenger and outside the windshield. The head-up display apparatus may image information, such as a traveling speed or a traveling direction, outside the windshield by using the windshield, glass or a reflector near the windshield, or the like (collectively referred to as a reflection unit in this application), so that the driver can view the driving information without lowering or turning the head. This application subsequently provides description by using an example in which a reflection unit is a windshield.

In a current head-up display apparatus in the industry, high brightness and low power consumption are a pair of contradictory requirements. The current head-up display apparatus cannot meet an expectation of a user for high brightness and low power consumption. To obtain high brightness, relatively high power consumption is required, and a reduced service life of a display element of the head-up display apparatus needs to be tolerated. In addition, excessive information displayed on the head-up display apparatus may interfere with driving of the user.

For the foregoing problems, the following describes, in detail with reference to the accompanying drawings, a head-up display apparatus and a head-up display method provided in this application. It should be understood that the technical solutions of this application may be applied to the automotive field, the aerospace field, and the navigation field. For example, the technical solutions of this application may be applied to a vehicle, or may be applied to another transport, such as an airplane, an aerospace aircraft, or a ship. This is not limited in the embodiments of this application. In this application, a vehicle, an airplane, an aerospace aircraft, a ship, and the like are collectively referred to as transports. The following uses a vehicle as an example for description. The technical solutions of this application may be further used in combination with an augmented reality (AR) technology.

Figure 2:
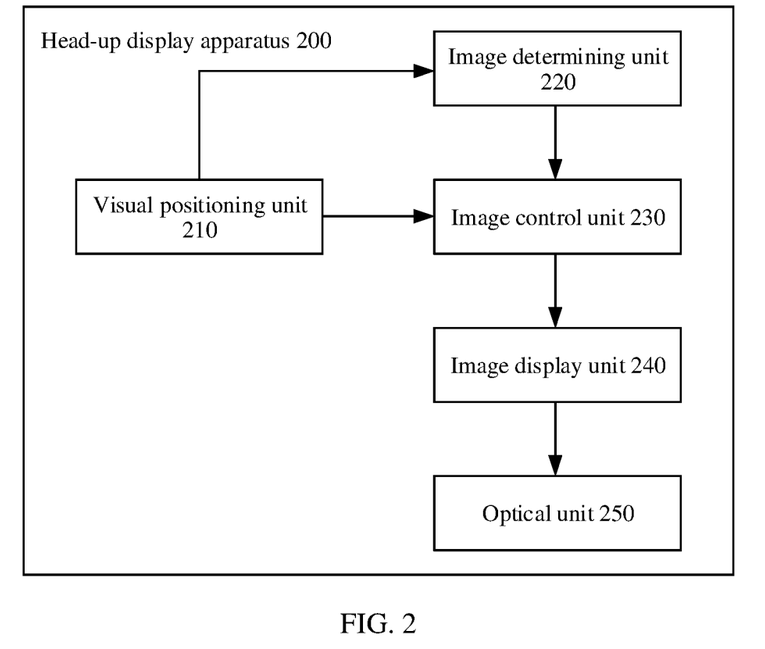
FIG. 2 is a schematic block diagram of a head-up display apparatus according to an embodiment of this application.
Figure 9:
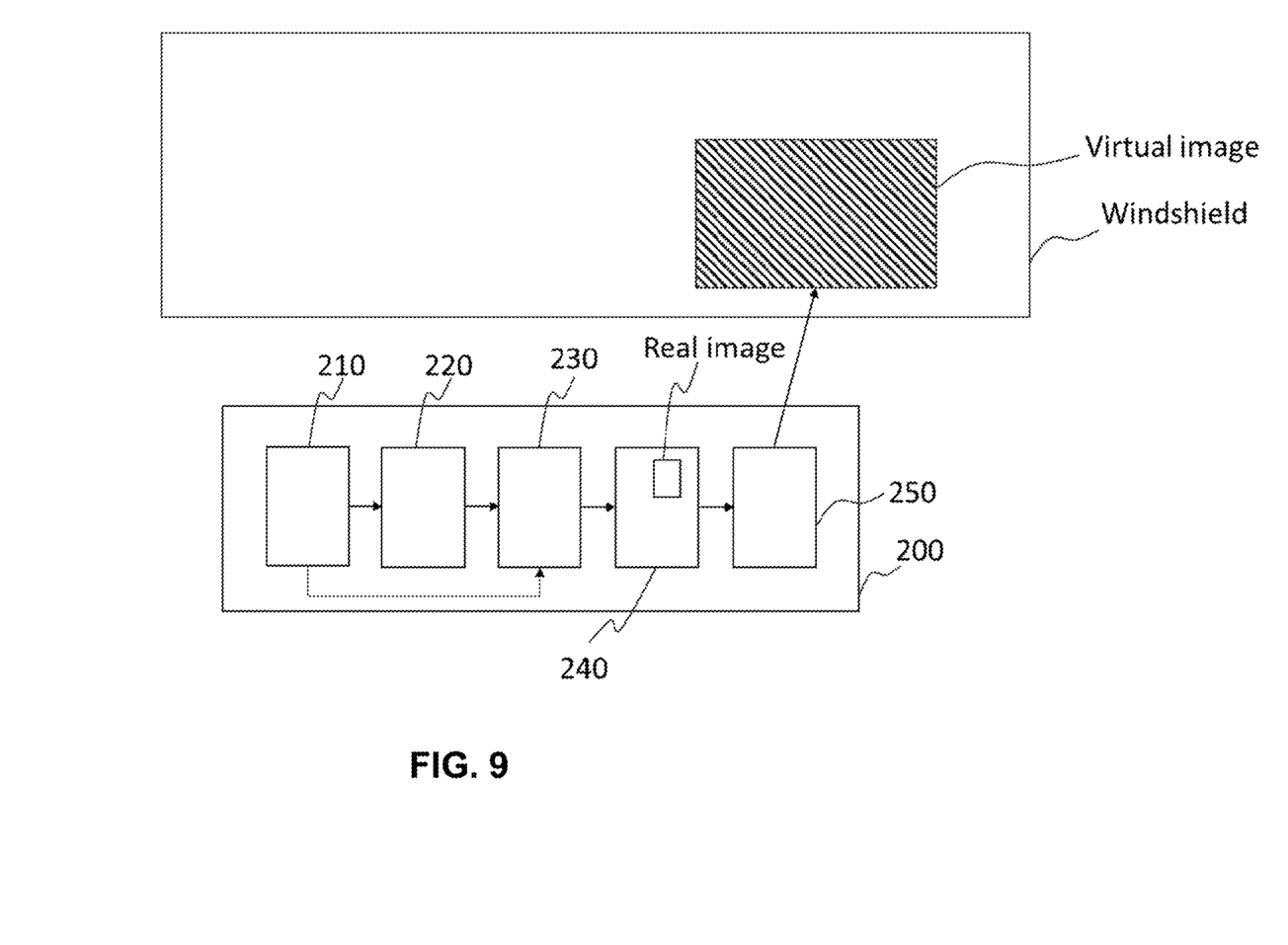
FIG. 9 is a schematic diagram showing the projection of a virtual image from a real image.

This application provides a head-up display apparatus. FIG. 2 is a schematic block diagram of a head-up display apparatus 200 according to an embodiment of this application. As shown in FIG. 2, the head-up display apparatus 200 includes a visual positioning unit 210, an image determining unit 220, an image control unit 230, an image display unit 240, and an optical unit 250. The visual positioning unit 210 is configured to: obtain line-of-sight information of a user, and determine a target display area based on the line-of-sight information, where the target display area is a sub-area of an overall display area corresponding to the image display unit. The image determining unit 220 is configured to determine an image of target content in the target display area, where the target content is content corresponding to the target display area in to-be-displayed content of the overall display area. The image control unit 230 is configured to adjust a light field to generate a real image of the target content in the target display area based on the image of the target content. The image display unit 240 is configured to display the real image of the target content. The optical unit 250 is configured to form a light beam based on the real image of the target content, to generate a virtual image of the target content. FIG. 9 shows that a real image displayed on the image display unit 240 is projected through the optical unit 250 to generate a virtual image on the windshield.

In the head-up display apparatus provided in this embodiment of this application, the target display area is determined based on the line-of-sight information of the user, where the target display area is the sub-area of the overall display area; and only the target content in the target display area is displayed, and content in an area other than the target display area is not displayed, so that power consumption of the head-up display apparatus can be reduced and a service life of a display element can be prolonged. In addition, displayed content can better conform to a visual characteristic of the user, to prevent excessive redundant information from interfering with the user, to enable the user to obtain a good visual effect, thereby helping improve driving safety.

In some embodiments of this application, the visual positioning unit 210 may obtain an image of a head, a face, or eyes by using a camera or the like, and parse out the line-of-sight information by using software; and then analyze the line-of-sight information to implement line-of-sight positioning and tracking, to determine the target display area. The visual positioning unit 210 may be specifically implemented based on an existing visual positioning product. For example, a typical visual positioning product includes an eye tracking system or an Eye Tribe line-of-sight tracker. The visual positioning unit 210 may obtain the line-of-sight information of the user in real time, or may not obtain the line-of-sight information of the user in real time. This is not limited in this application.

In some embodiments of this application, the image display unit 240 may correspond to one overall display area. The overall display area may include a plurality of sub-areas, and each of the plurality of sub-areas corresponds to a part of the to-be-displayed content. The target display area determined by the visual positioning unit 210 may be one of the plurality of sub-areas.

Specifically, the overall display area may be divided into the plurality of sub-areas in a fixed division manner or in an adaptive division manner. In other words, the plurality of sub-areas may be obtained by dividing the overall display area in the fixed division manner or in the adaptive division manner.

Figure 3:
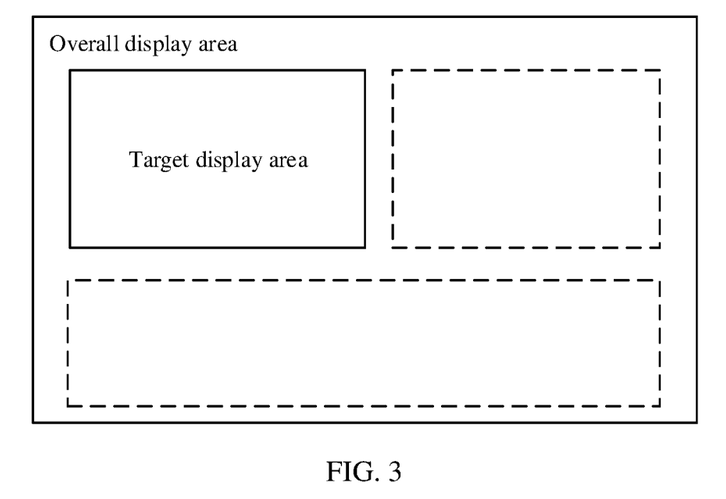
FIG. 3 is a schematic diagram of a target display area and an overall display area according to an embodiment of this application.

In an example, the overall display area of the image display unit 240 may be divided into the plurality of sub-areas in the fixed division manner, and a part of the to-be-displayed content is fixedly displayed in each sub-area. In other words, the sub-areas are in a one-to-one correspondence with parts of the to-be-displayed content, and the correspondence may be set by the user or a manufacturer. The pails of content may be displayed in an icon form. In other words, the sub-areas are in a one-to-one correspondence with icons. For example, a fuel gauge is fixedly displayed in a sub-area, an odometer is fixedly displayed in another sub-area, and a navigation map is fixedly displayed in still another sub-area. The visual positioning unit 210 determines, based on the line-of-sight information, a sub-area in which a line of sight falls, where the sub-area is the target display area; and an icon corresponding to the sub-area is displayed in the target display area. The sub-area in which the line of sight falls may be specifically determined by the visual positioning unit 210 through calculation. FIG. 3 is a schematic diagram of a target display area and an overall display area according to an embodiment of this application.

Figure 4:
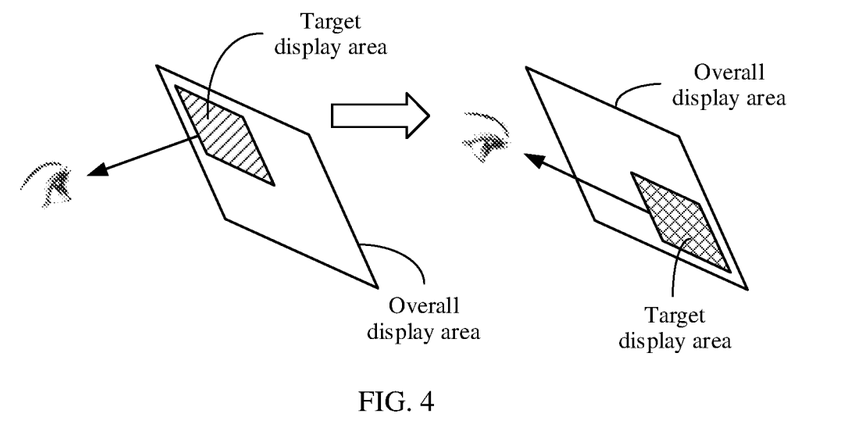
FIG. 4 is a schematic diagram of a change of a target display area with a line of sight of a user according to an embodiment of this application.

In another example, the plurality of sub-areas may be obtained by dividing the overall display area of the image display unit 240 in the adaptive division manner, and the target display area is determined. That is, the sub-areas are obtained through division based on surrounding environment information of a current vehicle, and a specific icon is displayed in the target display area in which a line of sight falls. For example, if a current field of view of the user includes a road surface, a remote building, and a front vehicle, the overall display area may be roughly divided into three sub-areas, respectively corresponding to the road surface, the remote building, and the front vehicle. If a line-of-sight position of the user is the road surface, a viewpoint-centered area may be used as the target display area to display a vehicle speed icon; if a line-of-sight position of the user is the remote building, a viewpoint-centered area may be used as the target display area to display a name icon of the building; or if a line-of-sight position of the user is the front vehicle, a viewpoint-centered area may be used as the target display area to display a vehicle distance icon. FIG. 4 is a schematic diagram of a change of a target display area with a line of sight of a user according to an embodiment of this application. The adaptive division may be applied to a scenario in which an AR technology is used in combination.

In some embodiments of this application, content (the target content) displayed on the head-up display apparatus depends on the user. The user selects to-be-displayed content based on an intention of the user by using the line of sight, instead of displaying all the to-be-displayed content. In an embodiment of this application, assuming that the to-be-displayed content includes m content modules, and power consumption required for displaying each content module is n, total power consumption required for displaying all the content modules is m*n. If the solution of this application is used to display only one content module in which the line of sight of the user is concentrated, required power consumption is n. Therefore, the head-up display apparatus in this embodiment of this application can keep low power consumption and prolong a service life of a display element while keeping high brightness.

In some embodiments of this application, the image determining unit 220 may be configured to provide the image of the target content in the target display area. The target content may include at least one of transport status content, road status content, and navigation content.

The image determining unit 220 may determine an image of all the to-be-displayed content in the overall display area based on information obtained during traveling. Because the to-be-displayed content changes in real time during traveling of the vehicle, in this solution, the image of all the to-be-displayed content can be determined in advance, and after the target display area to which the user pays attention is captured, image display can be directly controlled by using the image control unit 230, to help improve overall efficiency of the head-up display apparatus and avoid affecting user experience.

Alternatively, the image determining unit 220 may determine only the image of the target content in the target display area. This is not limited in the embodiments of this application. In this solution, after the target display area to which the user pays attention to is captured, the image of the target content is calculated, so that a total calculation amount is relatively small. An image determining unit 220 that achieves relatively fast processing may be configured, to prevent user experience from being affected by a latency caused by calculation.

In some embodiments of this application, the image display unit 240 may be a display screen, or the image display unit 240 may be a carrier that can be used for projection imaging, such as a diffusor or a screen. This is not limited in the embodiments of this application.

In some embodiments of this application, the optical unit 250 may project the image on the image display unit 240 onto a reflection unit (for example, a windshield) for magnification display, so that the user can observe the virtual image. The optical unit 250 may include a lens or a lens group. The optical unit 250 may be specifically based on an existing HUD optical system. This is not limited in the embodiments of this application.

In this embodiment of this application, the image control unit 230 modulates the light field based on a position of the target display area, to illuminate the target display area. In some embodiments of this application, the image control unit 230 may include a spatial light modulator (spatial light modulator, SLM). Image control is performed by using the SLM, so that a structure is simple and modulation is fast. Alternatively, the image control unit 230 may include another image control device. This is not limited in the embodiments of this application.

In some embodiments of this application, the image control unit 230 may be based on a single-stage SLM, such as a single-stage liquid crystal on silicon (liquid crystal on silicon, LCOS) element. In this embodiment of this application, the single-stage LCOS element may be used to directly generate the image of the target content, and control the image of the target content to be formed in the target display area. In this solution, a mechanical structure needs be relied on to adjust a light ray, so that only the image of the target content is generated in the target display area, and no image is displayed in other parts.

In other embodiments of this application, the image control unit 230 may include two stages of SLMs. A first-stage SLM is configured to illuminate the target display area, and a second-stage SLM is configured to load the image of the target content.

It should be understood that, in the embodiments of this application, the second-stage SLM may load only the image of the target content, or may load the image of all the to-be-displayed content of the overall display area. Because the first-stage SLM illuminates only the target display area, images in other areas are not displayed.

Optionally, each stage of SLM may be an LCOS element, in other words, the two stages of SLMs may be two stages of LCOS elements. A first-stage LCOS element is configured to illuminate the target display area, and a second-stage LCOS element is configured to load the image of the target content. In this solution, because light ray energy is concentrated in the target display area for imaging, imaging brightness is high. In addition, compared with an existing image control unit that displays all to-be-displayed content, only one stage of LCOS element needs to be added, without a need to adjust an opto-mechanical structure of the image control unit, so that a manufacturing process is simple. In other embodiments of this application, the SLM may be alternatively a liquid crystal display (LCD), a digital micro-mirror device (DMD), or the like.

In another embodiment of this application, the image control unit may alternatively include more stages of SLMs, for example, more stages of LCOS elements. Optionally, the image control unit 230 may further include another element, such as a light source.

The following describes in detail specific structures of image control units in several embodiments of this application.

In some embodiments of this application, the first-stage LCOS element in the two stages of LCOS elements of the image control unit is a phase-type LCOS element, and the second-stage LCOS element in the two stages of LCOS elements is an amplitude-type LCOS element. The first-stage LCOS element is configured to illuminate the target display area, and the second-stage LCOS element is configured to load the image of the target content.

Figure 5:
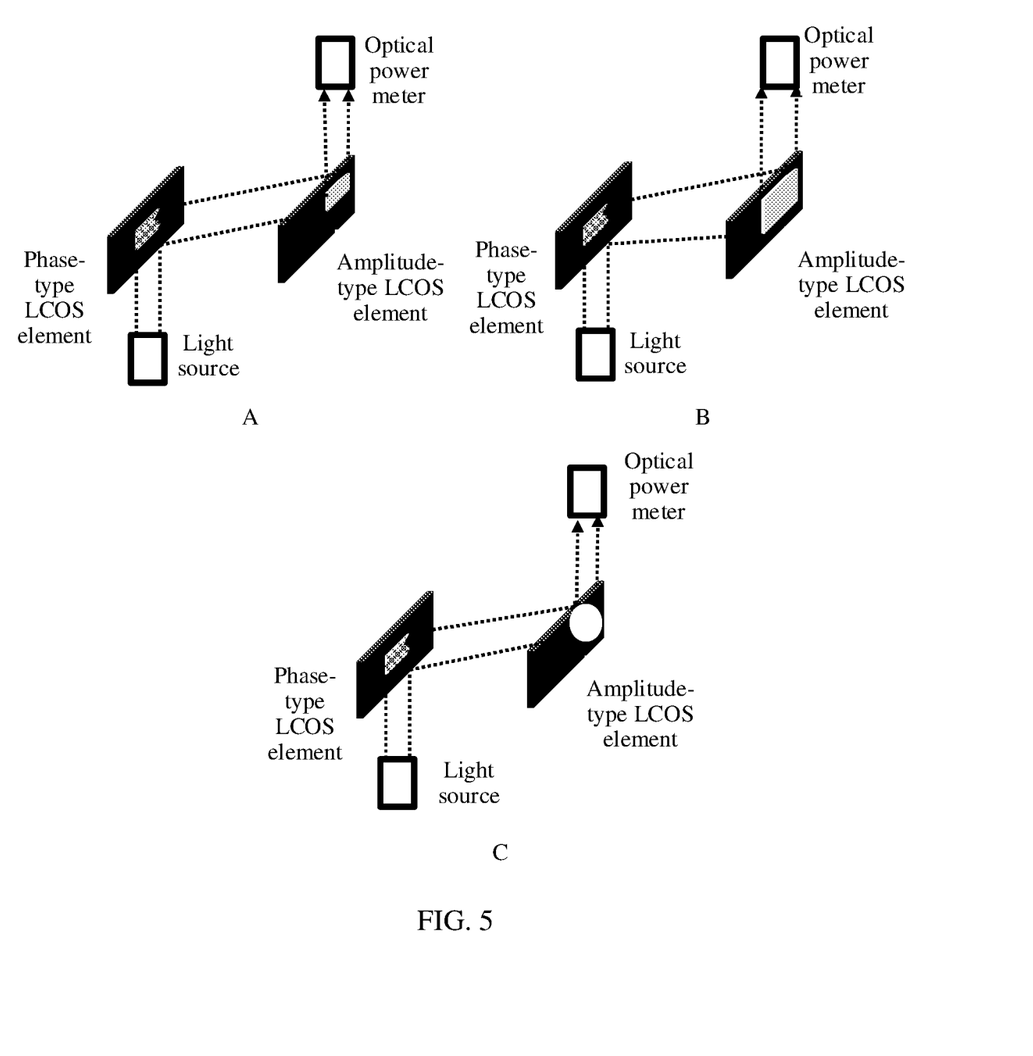
FIG. 5 is a schematic diagram of a structure of an image control unit according to an embodiment of this application.

FIG. 5 is a schematic diagram of a structure of an image control unit according to an embodiment of this application. As shown in A, B, and C in FIG. 5, the image control unit includes a light source (for example, the light source may be a fiber laser), a phase-type LCOS element used as a first-stage LCOS element, and an amplitude-type LCOS element used as a second-stage LCOS element.

The image control unit may be calibrated in a production process of the image control unit, or before delivery of the image control unit. An objective of the calibration is to find correspondences between the plurality of sub-areas in the overall display area and holographic phase distribution parameters of the first-stage LCOS element (phase-type LCOS element), and store the correspondences. During use of the image control unit, after the target display area is determined, holographic phase distribution parameters can be accurately and quickly changed by searching for a correspondence, to illuminate the target display area.

A specific calibration process may be: loading a gray image for the second-stage LCOS element (amplitude-type LCOS element), where a position, a size, and a shape of a white part in the gray image correspond to one sub-area; changing holographic phase distribution parameters of the phase-type LCOS element to change a position, a size, and a shape of a light ray on the amplitude-type LCOS element, and detecting a power value of the light ray on the amplitude-type LCOS element by using an optical power meter; and when the optical power meter reads a maximum power value, indicating that the change of the holographic phase distribution parameters of the phase-type LCOS element enables the sub-area to be illuminated, so that calibration of the sub-area is completed. A, B, and C in FIG. 5 separately show examples in which the holographic phase distribution parameters of the phase-type LCOS element are changed to change the position, the size, and the shape of the light ray on the amplitude-type LCOS element.

During user of the image control unit, an incident light ray emitted by the light source reaches the phase-type LCOS element. The holographic phase distribution parameters of the phase-type LCOS element may be adjusted based on a correspondence between the calibrated sub-area and the holographic phase distribution parameters of the phase-type LCOS element, to modulate the incident light ray. A modulated light ray is irradiated to a corresponding area of the amplitude-type LCOS element, namely, the target display area. A final expected image of the target content may be obtained on the amplitude-type LCOS element by adjusting holographic phase distribution parameters of the amplitude-type LCOS element.

In other embodiments of this application, both the first-stage LCOS element and the second-stage LCOS element in the two stages of LCOS elements of the image control unit are phase-type LCOS elements. The first-stage LCOS element is configured to illuminate the target display area, and the second-stage LCOS element is configured to load the image of the target content.

Figure 6:
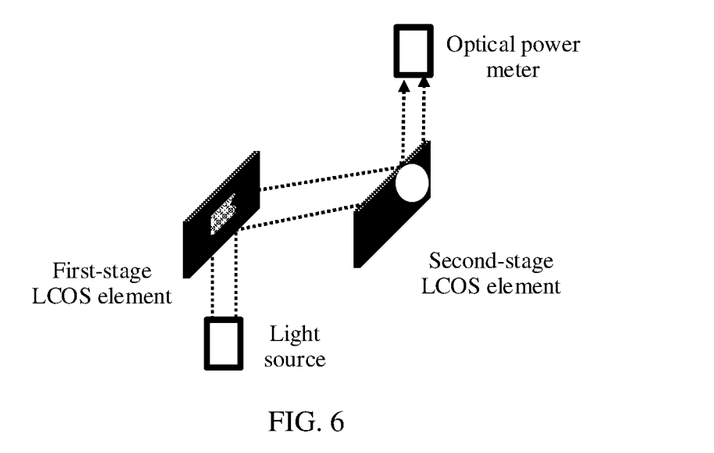
FIG. 6 is a schematic diagram of a structure of an image control unit according to another embodiment of this application.

FIG. 6 is a schematic diagram of a structure of an image control unit according to another embodiment of this application. As shown in FIG. 6, the image control unit includes a light source (for example, the light source may be a fiber laser), a phase-type LCOS element used as a first-stage LCOS element, and a phase-type LCOS element used as a second-stage LCOS element.

The image control unit may be calibrated in a production process of the image control unit, or before delivery of the image control unit. An objective of the calibration is to find correspondences between the plurality of sub-areas in the overall display area and holographic phase distribution parameters of the first-stage LCOS element, and store the correspondences. During use of the image control unit, after the target display area is determined, holographic phase distribution parameters can be accurately and quickly changed by searching for a correspondence, to illuminate the target display area.

A specific calibration process may be: loading a gray image for the second-stage LCOS element, where a position, a size, and a shape of a white part in the gray image correspond to one sub-area; changing holographic phase distribution parameters of the first-stage LCOS element to change a position, a size, and a shape of a light ray on the second-stage LCOS element, and detecting a power value of the light ray on the second-stage LCOS element by using an optical power meter; and when the optical power meter reads a maximum power value, indicating that the change of the holographic phase distribution parameters of the first-stage LCOS element enables the sub-area to be illuminated, so that calibration of the sub-area is completed.

During use of the image control unit, an incident light ray emitted by the light source reaches the first-stage LCOS element. The holographic phase distribution parameters of the first-stage LCOS element may be adjusted based on a correspondence between the calibrated sub-area and the holographic phase distribution parameters of the first-stage LCOS element, to modulate the incident light ray. A modulated light ray is irradiated to a corresponding area of the second-stage LCOS element, namely, the target display area. A final expected image of the target content may be obtained on the second-stage LCOS element by adjusting holographic phase distribution parameters of the second-stage LCOS element.

In still other embodiments of this application, both the first-stage LCOS element and the second-stage LCOS element in the two stages of LCOS elements of the image control unit are phase-type LCOS elements. There is a first polarizer between the first-stage LCOS element and the second-stage LCOS element, and there is a second polarizer behind the second-stage LCOS element. The first-stage LCOS element is configured to illuminate the target display area, and the second-stage LCOS element is configured to load the image of the target content.

Optionally, polarization directions of the first polarizer and the second polarizer may be orthogonal to each other. A combination of the two polarizers and the second-stage LCOS element may be equivalent to an amplitude-type LCOS element.

Figure 7:
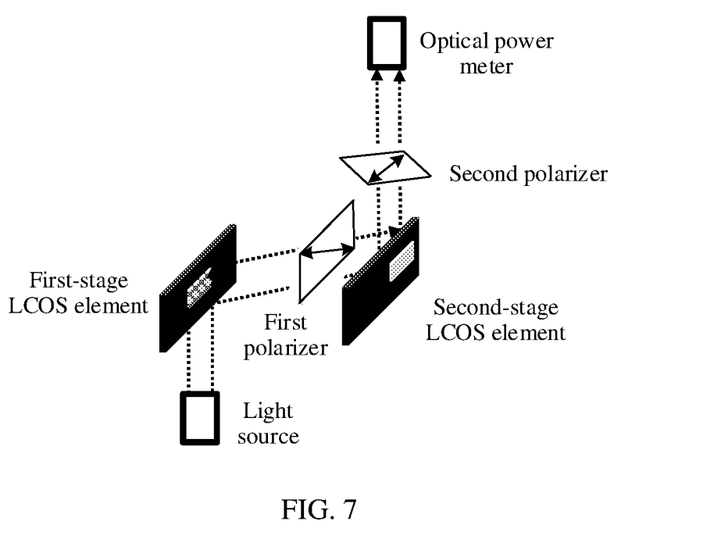
FIG. 7 is a schematic diagram of a structure of an image control unit according to still another embodiment of this application.

FIG. 7 is a schematic diagram of a structure of an image control unit according to still another embodiment of this application. As shown in FIG. 7, the image control unit includes a light source (for example, the light source may be a fiber laser), a phase-type LCOS element used as a first-stage LCOS element, a first polarizer located between the first-stage LCOS element and the second-stage LCOS element, a phase-type LCOS element used as a second-stage LCOS element, and a second polarizer behind the second-stage LCOS element.

The image control unit may be calibrated in a production process of the image control unit, or before delivery of the image control unit. An objective of the calibration is to find correspondences between the plurality of sub-areas in the overall display area and holographic phase distribution parameters of the first-stage LCOS element, and store the correspondences. During use of the image control unit, after the target display area is determined, holographic phase distribution parameters can be accurately and quickly changed by searching for a correspondence, to illuminate the target display area.

A specific calibration process may be: loading a gray image for the second-stage LCOS element, where a position, a size, and a shape of a white part in the gray image correspond to one sub-area; changing holographic phase distribution parameters of the first-stage LCOS element to change a position, a size, and a shape of a light ray on the second-stage LCOS element, and detecting a power value of the light ray on the second-stage LCOS element by using an optical power meter; and when the optical power meter reads a maximum power value, indicating that the change of the holographic phase distribution parameters of the first-stage LCOS element enables the sub-area to be illuminated, so that calibration of the sub-area is completed.

During use of the image control unit, an incident light ray emitted by the light source reaches the first-stage LCOS element. The holographic phase distribution parameters of the first-stage LCOS element may be adjusted based on a correspondence between the calibrated sub-area and the holographic phase distribution parameters of the first-stage LCOS element, to modulate the incident light ray. A modulated light ray is irradiated to a corresponding area of the second-stage LCOS element, namely, the target display area. A final expected image of the target content may be obtained on the second-stage LCOS element by adjusting holographic phase distribution parameters of the second-stage LCOS element.

In the embodiments of this application, the first-stage SLM may be used to change distribution of the light field, and the second-stage SLM may be used to provide an image source. The light field is modulated by using the first-stage SLM, to illuminate a corresponding area of the second-stage SLM, thereby achieving high brightness and low power consumption.

The phase-type LCOS changes only a phase of a light ray without affecting intensity and a polarization state of the light ray, and may change distribution of the light field, or may be used as a holographic imaging element. The amplitude-type LCOS can change only intensity of a light ray, and may be used as a holographic imaging element. Therefore, in the embodiments of this application, the first-stage SLM is disposed as a phase-type LCOS element, and the second-stage SLM may be a phase-type LCOS or an amplitude-type LCOS.

Figure 8:
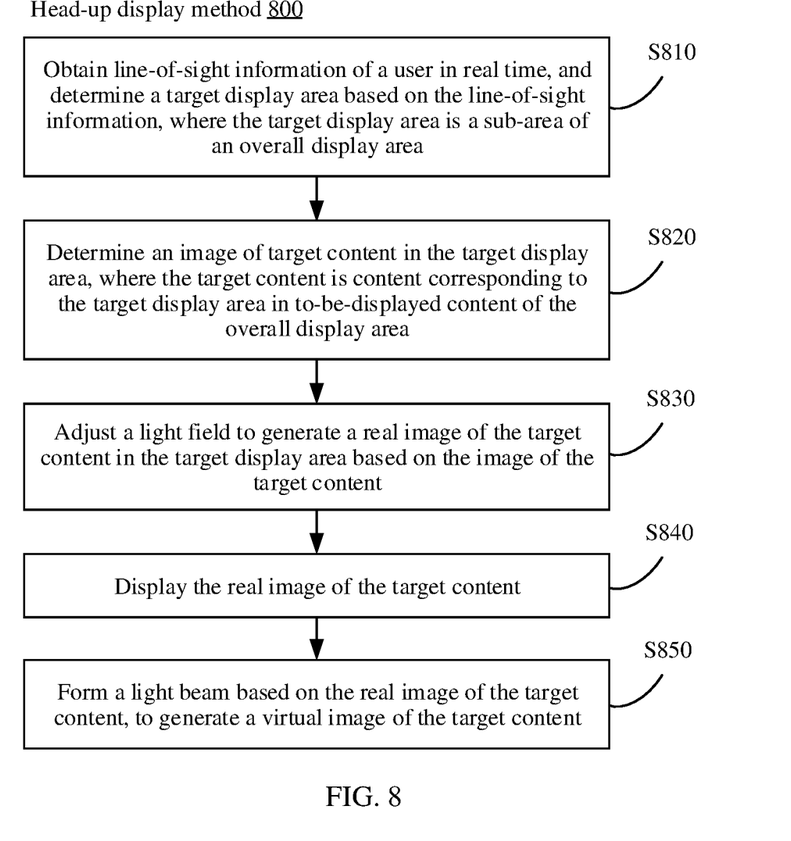
FIG. 8 is a schematic flowchart of a head-up display method according to an embodiment of this application.

This application further provides a head-up display method. FIG. 8 is a schematic flowchart of a head-up display method 800 according to an embodiment of this application. The method 800 includes the following steps:

S810: Obtain line-of-sight information of a user, and determine a target display area based on the line-of-sight information, where the target display area is a sub-area of an overall display area.

S820: Determine an image of target content in the target display area, where the target content is content corresponding to the target display area in to-be-displayed content of the overall display area.

S830: Adjust a light field to generate a real image of the target content in the target display area based on the image of the target content.

S840: Display the real image of the target content.

S850: Form a light beam based on the real image of the target content, to generate a virtual image of the target content.

In the head-up display method provided in this embodiment of this application, the target display area is determined based on the line-of-sight information of the user, where the target display area is the sub-area of the overall display area; and only the target content in the target display area is displayed, and content in an area other than the target display area is not displayed, so that power consumption of a head-up display apparatus can be reduced and a service life of a display element can be prolonged. In addition, displayed content can better conform to a visual characteristic of the user, to prevent excessive redundant information from interfering with the user, to enable the user to obtain a good visual effect, thereby helping improve driving safety.

In some embodiments of this application, the adjusting a light field to generate a real image of the target content in the target display area based on the image of the target content in S830 may include: adjusting the light field by using a spatial light modulator SLM, to generate the real image of the target content in the target display area based on the image of the target content. In another embodiment of this application, the real image of the target content may be generated in the target display area based on another image control device. This is not limited in the embodiments of this application.

Optionally, in some embodiments, the light field may be adjusted by using one stage of SLM, to generate the real image of the target content in the target display area; or the light field may be adjusted by using two stages of SLMs, to generate the real image of the target content in the target display area.

The SLM may be LCOS, an LCD, a DMD, or the like.

In some embodiments of this application, the light field is adjusted by using two stages of SLMs, to generate the real image of the target content in the target display area. The SLM is an LCOS element. A first-stage LCOS element is configured to illuminate the target display area, and a second-stage LCOS element is configured to load the image of the target content. Optionally, the head-up display apparatus may further include another element, such as a light source. In another embodiment of this application, the head-up display apparatus may alternatively include more stages of SLMs, for example, more stages of LCOS elements.

In some embodiments of this application, the adjusting the light field by using two stages of SLMs (for example, two stages of LCOS elements), to generate the real image of the target content in the target display area based on the image of the target content may include: adjusting holographic phase distribution parameters of the first-stage LCOS element, to illuminate the target display area; and adjusting holographic phase distribution parameters of the second-stage LCOS element, to generate the real image of the target content.

In some embodiments of this application, the first-stage LCOS element in the two stages of LCOS elements is a phase-type LCOS element, and the second-stage LCOS element in the two stages of LCOS elements is an amplitude-type LCOS element.

In some embodiments of this application, both the first-stage LCOS element and the second-stage LCOS element in the two stages of LCOS elements are phase-type LCOS elements.

In some embodiments of this application, there is a first polarizer between the first-stage LCOS element and the second-stage LCOS element, and there is a second polarizer behind the second-stage LCOS element.

In some embodiments of this application, the head-up display method 800 may further include a calibration process. The calibration process includes: loading a gray image for the second-stage LCOS element, where a position, a size, and a shape of a white part in the gray image correspond to one of a plurality of sub-areas; changing holographic phase distribution parameters of the first-stage LCOS element to change a position, a size, and a shape of a light ray on the second-stage LCOS element, and detecting a power value of the light ray on the second-stage LCOS element by using an optical power meter; and when the optical power meter reads a maximum power value, indicating that the change of the holographic phase distribution parameters the first-stage LCOS element enables the sub-area to be illuminated, so that calibration of the sub-area is completed.

The foregoing steps are repeatedly performed for each of the plurality of sub-areas until calibration of all the sub-areas is completed.

In some embodiments of this application, the overall display area corresponding to an image display unit includes the plurality of sub-areas, and each of the plurality of sub-areas corresponds to a part of the to-be-displayed content. The target display area is one of the plurality of sub-areas.

In some embodiments of this application, the plurality of sub-areas are obtained by dividing the overall display area in a fixed division manner or in an adaptive division manner.

In some embodiments of this application, the target content includes at least one of transport status content, road status content, and navigation content.

This application further provides a computer-readable medium, configured to store a computer program. The computer program includes instructions used to perform the method Boo.

This application further provides a computer program. The computer program includes instructions used to perform the method 800.

This application further provides a chip. Instructions are stored in the chip, and when the instructions run on a head-up display apparatus, the head-up display apparatus is enabled to perform the method 800.

It may be clearly understood by a person skilled in the art that, for convenient and brief description, the steps of the foregoing described method may be performed based on corresponding modules, units, and devices in the foregoing product embodiments. Details are not described herein again.

It should be understood that various numbers in this specification are merely used for distinguishing for convenient description, but are not intended to limit the scope of this application.

It should be understood that sequence numbers of the foregoing processes do not mean execution sequences in embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium, for example, a USB flash drive, a removable hard disk, a read-only memory (read-only memory, ROM), a random access memory (random access memory, RAM), a magnetic disk, or an optical disc, that can store program code.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A head-up display apparatus, comprising a camera, at least one processing circuit, a screen, and one or more lenses, wherein the head-up display apparatus is configured to:
   obtain line-of-sight information of a user with the camera and the at least one processing circuit, and determine a target display area in the screen based on the line-of-sight information, wherein the screen comprises an overall display area, the overall display area is divided into a plurality of sub-areas, the target display area is a sub-area of the plurality of sub-areas in the screen comprised in the head-up display apparatus, wherein dividing the overall display area into the plurality of sub-areas includes: fixedly dividing the overall display area into at least two sub-areas of predetermined size, or adaptively dividing the overall display area into at least two sub-areas having sizes based on sensed information, wherein the at least two sub-areas of the predetermined size or the at least two sub-areas having sizes based on the sensed information are defined at different positions in a horizontal direction;
   determine an image of target content in the target display area, wherein the target content is content corresponding to the target display area in to-be-displayed content of the overall display area;
   adjust a light field to generate, in the screen, a real image of the target content in the target display area based on the image of the target content;
   display the real image of the target content; and
   form a light beam based on the real image of the target content, to generate a virtual image of the target content on a windshield.

2. The head-up display apparatus according to claim 1, further comprising a light source and a spatial light modulator (SLM), wherein the head-up display apparatus is configured to adjust the light field with the light source and the SLM.

3. The head-up display apparatus according to claim 2, further comprising two stages of SLMs.

4. The head-up display apparatus according to claim 3, wherein the two stages of SLMs are two stages of liquid-crystal-on-silicon (LCOS) elements, a first-stage LCOS element in the two stages of LCOS elements is a phase-type LCOS element, and a second-stage LCOS element in the two stages of LCOS elements is an amplitude-type LCOS element.

5. The head-up display apparatus according to claim 3, wherein the two stages of SLMs are two stages of liquid-crystal-on-silicon (LCOS) elements, both a first-stage LCOS element and a second-stage LCOS element in the two stages of LCOS elements are phase-type LCOS elements.

6. The head-up display apparatus according to claim 5, wherein there is a first polarizer between the first-stage LCOS element and the second-stage LCOS element, and there is a second polarizer behind the second-stage LCOS element.

7. The head-up display apparatus according to claim 1, wherein each of the plurality of sub-areas corresponds to a part of the to-be-displayed content, and wherein only the part of the to-be-displayed content in the target display area is displayed.

8. The head-up display apparatus according to claim 1, wherein the target content comprises at least one of transport status content, road status content, and navigation content.

9. A display method performed using a head-up display apparatus comprising a camera, at least one processing circuit, a screen, and one or more lenses, the method comprising:
    obtaining line-of-sight information of a user with a camera and at least one processing circuit, and determining a target display area in the screen based on the line-of-sight information, wherein the screen comprises an overall display area, the overall display area is divided into a plurality of sub-areas, wherein the target display area is a sub-area of the plurality of sub-areas in the screen comprised in the head-up display apparatus, wherein dividing the overall display area into the plurality of sub-areas includes: fixedly dividing the overall display area into at least two sub-areas of predetermined size, or adaptively dividing the overall display area into at least two sub-areas having sizes based on sensed information, wherein the at least two sub-areas of the predetermined size or the at least two sub-areas having sizes based on the sensed information are defined at different positions in a horizontal direction;
    adjusting a light field to generate, in the screen, a real image of target content based on the target content in the target display area; and
    forming a light beam based on the real image of the target content, and projecting the light beam onto a windshield, to generate a virtual image of the target content.

10. The method according to claim 9, wherein the adjusting a light field to generate a real image of target content based on the target content in the target display area comprises:
    adjusting the light field by using two stages of spatial light modulators SLMs, to generate the real image of the target content based on the target content in the target display area.

11. The method according to claim 9, wherein the adjusting a light field to generate a real image of target content based on the target content in the target display area comprises:
    adjusting holographic phase distribution parameters of a phase-type liquid-crystal-on-silicon (LCOS) element, to modulate an incident light ray; and
    emitting a modulated light ray onto an amplitude-type LCOS element, and generating, by the amplitude-type LCOS element, the real image of the target content based on the target content in the target display area.

12. The method according to claim 9, wherein the target content comprises road status content.

13. A transport, comprising a head-up display apparatus, the head-up display apparatus comprising a camera, at least one processing circuit, a screen, and one or more lenses, wherein the head-up display apparatus is configured to:
    obtain line-of-sight information of a user with the camera and the at least one processing circuit, and determine a target display area in the screen based on the line-of-sight information, wherein the screen comprises an overall display area, the overall display area is divided into a plurality of sub-areas, the target display area is a sub-area of the plurality of sub-areas in the screen comprised in the head-up display apparatus, wherein dividing the overall display area into the plurality of sub-areas includes: fixedly dividing the overall display area into at least two sub-areas of predetermined size, or adaptively dividing the overall display area into at least two sub-areas having sizes based on sensed information, wherein the at least two sub-areas of the predetermined size or the at least two sub-areas having sizes based on the sensed information are defined at different positions in a horizontal direction;
    determine an image of target content in the target display area, wherein the target content is content corresponding to the target display area in to-be-displayed content of the overall display area;
    adjust a light field to generate, in the screen, a real image of the target content in the target display area based on the image of the target content;
    display the real image of the target content; and
    form a light beam based on the real image of the target content, to generate a virtual image of the target content on a windshield.

14. The transport according to claim 13, further comprising a light source and a spatial light modulator (SLM), wherein the head-up display apparatus is configured to adjust the light field with the light source and the SLM.

15. The transport according to claim 14, further comprising two stages of SLMs.

16. The transport according to claim 15, wherein the two stages of SLMs are two stages of liquid-crystal-on-silicon (LCOS) elements, a first-stage LCOS element in the two stages of LCOS elements is a phase-type LCOS element, and a second-stage LCOS element in the two stages of LCOS elements is an amplitude-type LCOS element.

17. The transport according to claim 15, wherein the two stages of SLMs are two stages of LCOS elements, both a first-stage LCOS element and a second-stage LCOS element in the two stages of LCOS elements are phase-type LCOS elements.

18. The transport according to claim 17, wherein there is a first polarizer between the first-stage LCOS element and the second-stage LCOS element, and there is a second polarizer behind the second-stage LCOS element.

19. The transport according to claim 13, wherein each of the plurality of sub-areas corresponds to a part of the to-be-displayed content, and wherein only the part of the to-be-displayed content in the target display area is displayed.

20. The transport according to claim 13, wherein the target content comprises at least one of transport status content, road status content, and navigation content.

* * * * *